United States Patent [19]
Forbord

[11] Patent Number: 5,764,440
[45] Date of Patent: Jun. 9, 1998

[54] THREE FLANGE CARRIAGE STRUCTURE FOR IMPROVED VOICE COIL SUPPORT

[75] Inventor: Kent Jon Forbord, St. Louis Park, Minn.

[73] Assignee: Seagate Technology, Inc., Scotts Valley, Calif.

[21] Appl. No.: 24,539

[22] Filed: Mar. 1, 1993

[51] Int. Cl.$^6$ .................................................. G11B 5/55
[52] U.S. Cl. ........................................................ 360/106
[58] Field of Search ............................. 360/104–106

[56] References Cited

U.S. PATENT DOCUMENTS

| | | | |
|---|---|---|---|
| 3,747,204 | 7/1973 | Beavers | 29/594 |
| 4,544,890 | 10/1985 | Albert | 324/163 |
| 4,571,649 | 2/1986 | Goss | 360/106 |
| 4,652,779 | 3/1987 | Wilcox | 310/13 |
| 4,728,831 | 3/1988 | Cheng | 310/13 |
| 5,016,131 | 5/1991 | Riggle et al. | 360/106 |
| 5,027,241 | 6/1991 | Hatch et al. | 360/105 |
| 5,041,935 | 8/1991 | Aruga et al. | 360/106 |
| 5,050,026 | 9/1991 | Goss | 360/106 |
| 5,168,185 | 12/1992 | Umehara et al. | 360/106 |
| 5,231,557 | 7/1993 | Ogawa et al. | 360/106 |
| 5,233,493 | 8/1993 | Eliason | 360/106 |
| 5,247,410 | 9/1993 | Ebihara et al. | 360/106 |
| 5,301,078 | 4/1994 | Makino et al. | 360/106 |

*Primary Examiner*—Jefferson Evans
*Attorney, Agent, or Firm*—Kinney & Lange, P.A.

[57] ABSTRACT

An improved actuator support structure for supporting rotary actuator coils in a disc drive system. The support structure includes a support which extends from a central portion to the actuator coil so that when the coil is excited, the coil will remain in tension. The invention increases all natural frequencies of the actuator coil so that servo stability is enhanced. In a preferred embodiment, the support structure fits into a magnetic pole piece such that the actuator coil occupies a gap space between a front leg and a back leg of the magnetic pole piece.

13 Claims, 5 Drawing Sheets

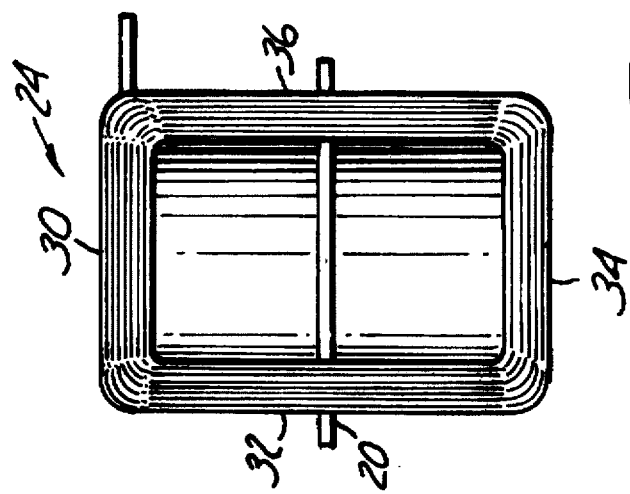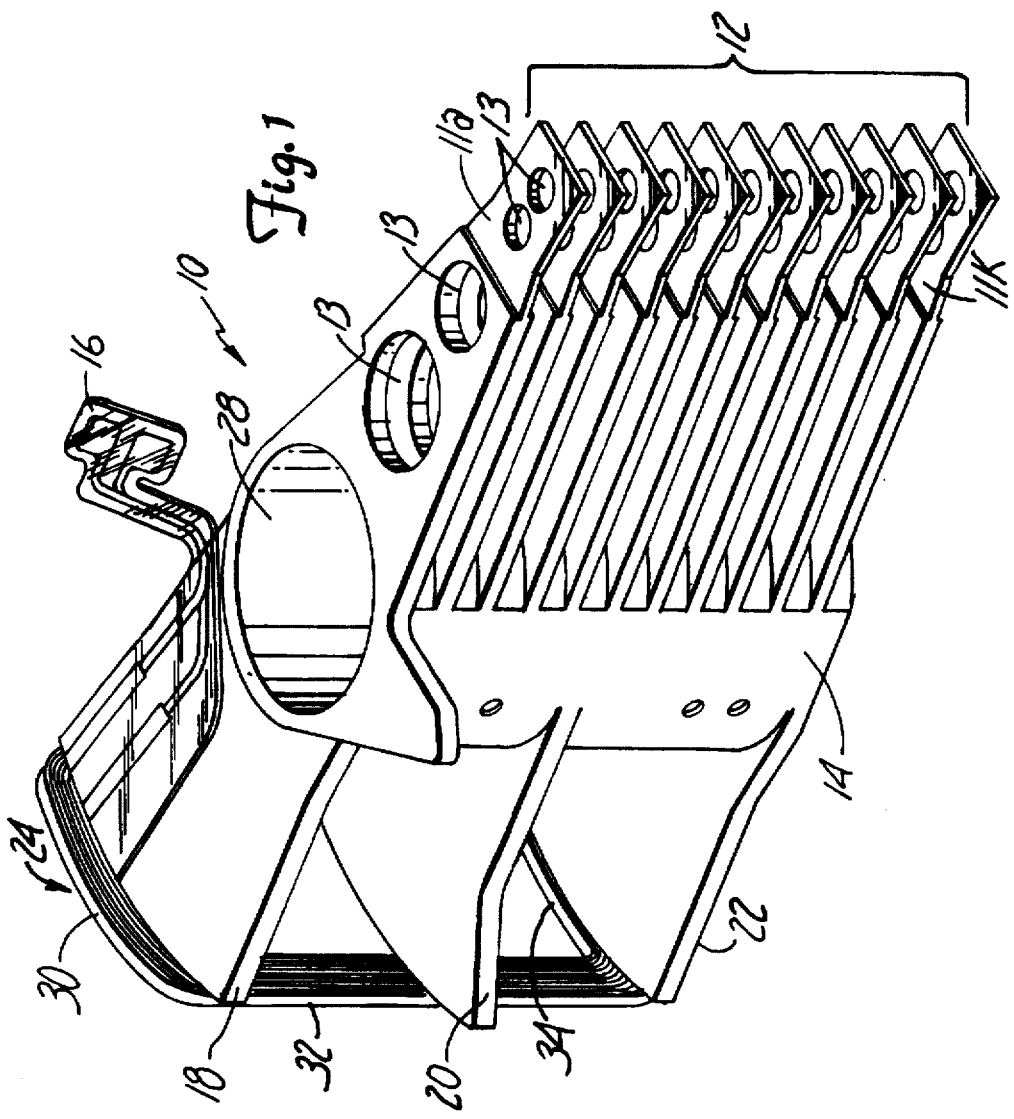

THREE FLANGE CARRIAGE STRUCTURE FOR IMPROVED VOICE COIL SUPPORT

BACKGROUND OF THE INVENTION

The present invention relates to track accessing arm movement in rotating disc drive memory assemblies. More specifically, the present invention relates to rotary actuator support structures employed in disc drive memory assemblies.

Rotating disc memories include one or more discs driven about a vertical spindle axis. Each disc typically has a plurality of concentric tracks on one or both surfaces from which information is read or onto which information is written by means of reading and/or writing heads, i.e., a transducer head assembly. One of the discs generally carries dedicated servo tracks which contain head position information which is read by a dedicated servo head. The servo head provides a position feedback input to a servo system which positions the head over the surface of the disc, generally moving the head over the tracks on the surface of the disc. The transducer head assembly is typically connected to a resilient member, such as a gimbal spring, which in turn is connected to an end of a track accessing arm.

A plurality of track accessing arms form a configuration known in the art as an "E-block". Each track accessing arm of the E-block carries a transducer head assembly on a first end. A second end of each track accessing arm is connected to a central portion which forms an axis of rotation between an actuator coil and the E-block assembly. The actuator coil is attached to a coil support structure which also extends from a side of the central portion positioned opposite the track accessing arms. The actuator itself is placed proximate to a magnetic pole piece, which includes permanent magnets and a block formed of materials having ferromagnetic properties.

Applying a current to the actuator coil positions and holds the transducer head assembly over selected concentric tracks of the magnetic media disc. The coil is selectively energized by the disc drive system to move with respect to the magnetic pole piece. The movement of the actuator coil is transferred to the transducer heads via the actuator support structure.

In an ideal track seek operation, the servo control system of the disc drive applies current to the actuator coil which is positioned proximate to the magnetic pole piece. The current applied to the actuator coil induces a transient magnetic field which emanates from the coil and interacts with a permanent magnetic field of the magnetic pole piece. The interaction of the permanent and transient magnetic fields causes movement of the actuator coil proximate to the magnetic pole piece. Since the actuator coil is connected to the central portion, via the coil support structure, movement of the coil is transferred to the central portion so that it rotates about its axis of rotation. The E-block assembly, which is also connected to the central portion on a side opposite the actuator support structure also rotates, thereby moving the transducer head assembly over the magnetic media disc to a desired track location.

In practice, however, the force imparted to the actuator coil when current flows through it excites natural frequencies in the actuator coil. In particular, out-of-plane bending (or bending back and forth of the coil) results in an off-track error of the transducer heads since the force is being imparted to a resonating coil.

Most low frequency resonances, including out-of-plane bending of voice coils are problematic since lower frequency resonances have larger displacements. There is also less gain margin in classical second order servo control systems at lower frequencies. Insufficient gain margin can cause the servo system to go classically unstable which shows up as off-track error at the transducer head. Gain margin at resonant peaks limits the bandwidth of the servo system. A servo system with a higher bandwidth is desirable since it can more accurately follow externally induced disturbances. Thus, in order to decrease off-track error and/or increase gain margin, it is desirable to increase the natural frequencies of the voice coil.

There has, therefore, been a need for an actuator support structure which minimizes low frequency resonance modes. The prior art has focused on damping actuator coil vibrations. In one embodiment of the prior art, elastomeric material is used between an actuator coil and a support structure to dampen vibrations. This method is shown in U.S. Pat. No. 4,144,466.

In other embodiments found in the prior art, various support structures are shown which are designed to avoid the low frequency resonance problems associated with movement of the actuator. None of these designs, however, show a support structure which eliminates low frequency resonance problems in a compact fashion as does the present invention.

SUMMARY OF THE INVENTION

The present invention overcomes low frequency resonance problems associated with actuator coil structures. Specifically, the present invention provides coil support for a vertical, flat, voice coil actuator (voice coil) which substantially increases the natural resonant frequencies of the voice coil such that servo control is no longer adversely affected by low frequency bending modes of the voice coil.

Enhanced servo stability is achieved by providing coil support which contacts the voice coil in a manner so that stiffness is increased and bending does not occur at low frequencies. The actuator support structure contacts the voice coil at two points across the mid-section of the coil. These contact points reduce the unsupported length of the coil. Out-of-plane bending of the voice coil columns resembles a beam supported at both ends. Classical beam theory shows that natural resonant frequencies are increased as the unsupported length is decreased. Hence, by adding an additional coil support which contacts the voice coil, the frequency at which the voice coil bends in out-of-plane directions is increased to the point at which it no longer adversely affects servo control. In plane and torsional natural frequencies are also increased.

In a preferred embodiment of the invention, three flanges serve as the voice coil support structure. Each flange is parallel to the flux path contained in the magnetic pole piece. Thus, minimal eddy currents are generated with the flange configuration. An intermediate second flange provides support for the voice coil along its mid-section thereby, decreasing the unsupported length of the vertical voice coil columns. In doing so, the low frequency bending modes are eliminated and the natural frequencies of the voice coil are increased. Thus, the preferred embodiment of the present invention increases the natural frequency of the voice coil resonances and allows for better servo control.

BRIEF DESCRIPTION OF THE DRAWINGS

FIG. 1 is a perspective view of an actuator arm assembly used in a preferred embodiment of the present invention.

FIG. 1A shows a front view of a voice coil shown in FIG. 1.

3

Figure 2:
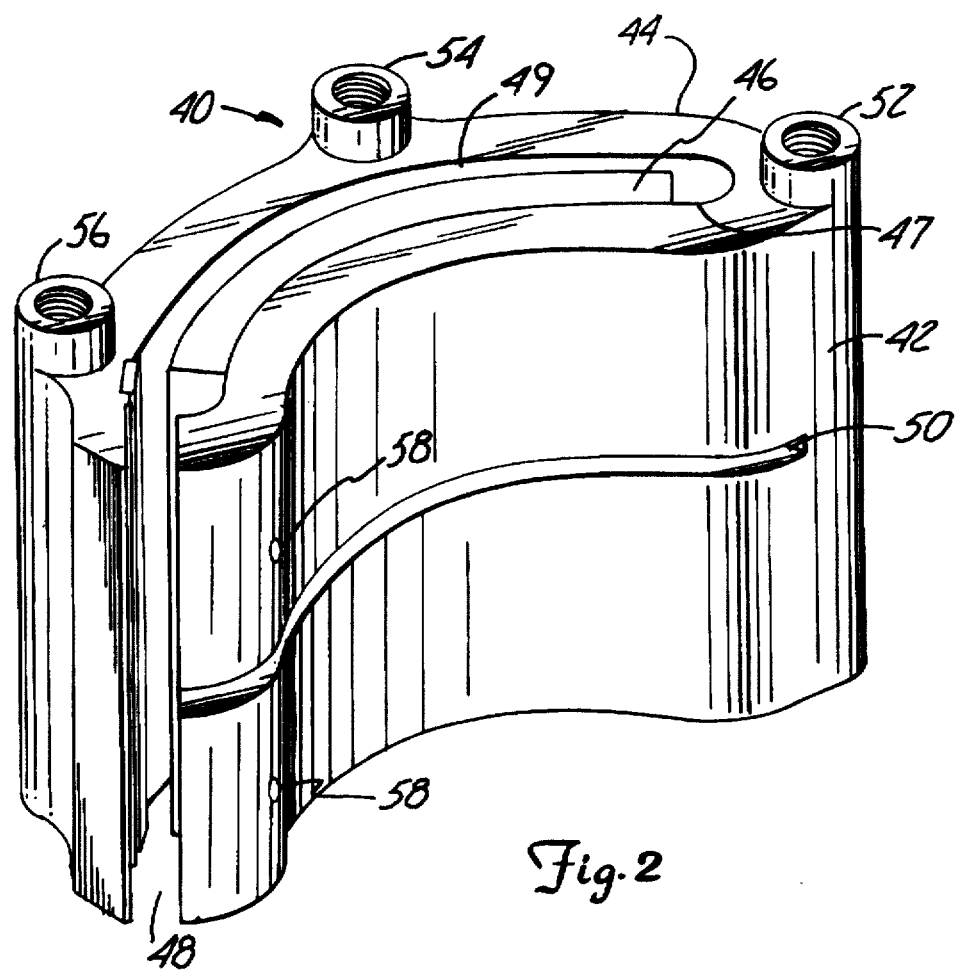

FIG. 2 is perspective view of a magnetic pole piece used in a preferred embodiment of the present invention.

Figure 3:
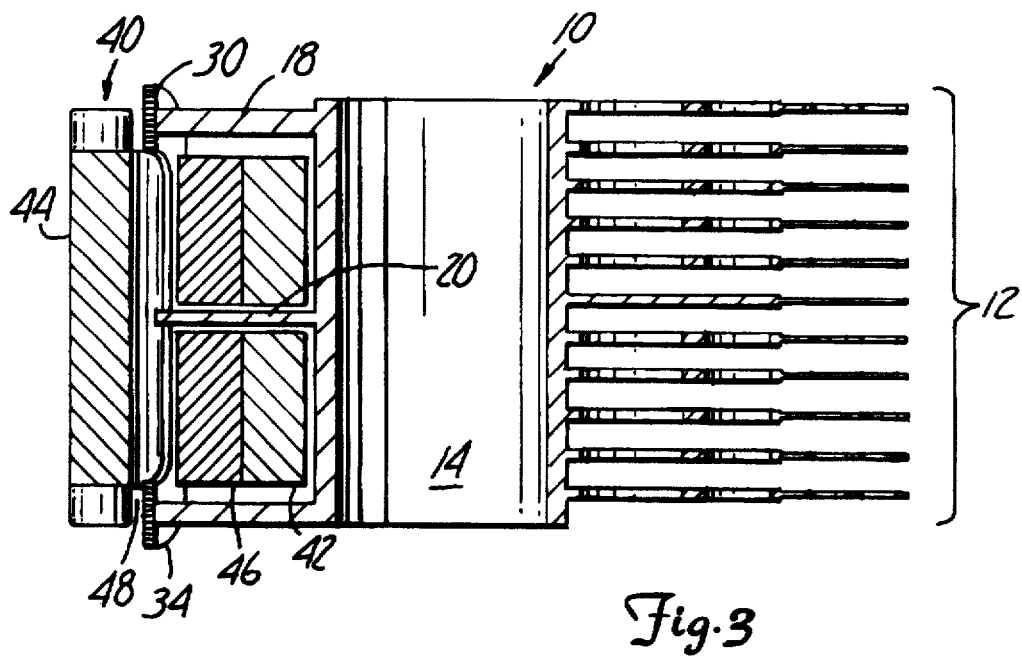

FIG. 3 is a side cross sectional view of the actuator arm assembly used in conjunction with the magnetic pole piece in accordance with a preferred embodiment of the present invention.

Figure 4:
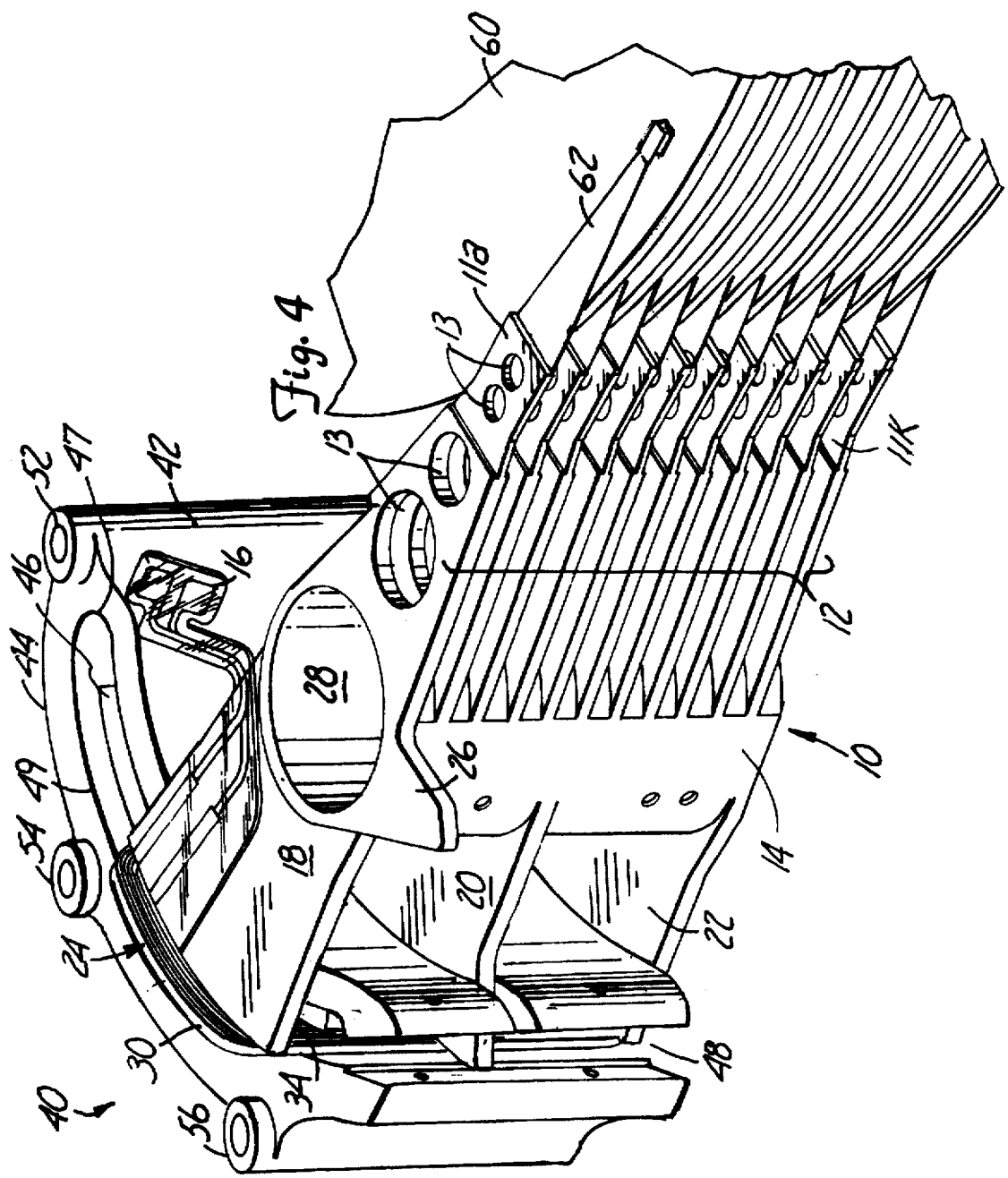

FIG. 4 shows a perspective view of the actuator support assembly and magnetic pole piece shown in FIG. 3.

Figure 5:
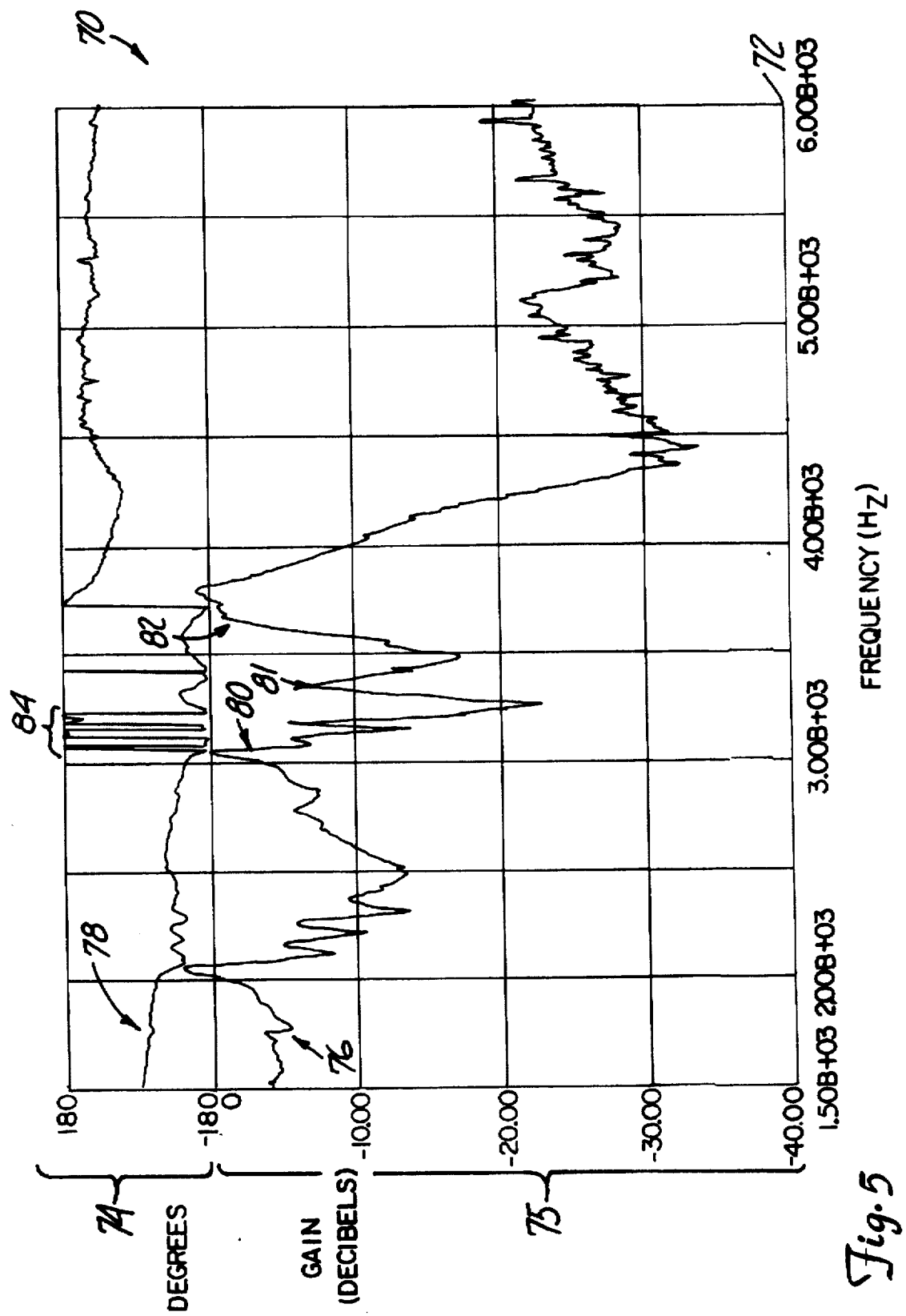

FIG. 5 is the open loop bode plot of a disc drive system employing with a prior art actuator arm assembly with the voice coil supported at each end.

Figure 6:
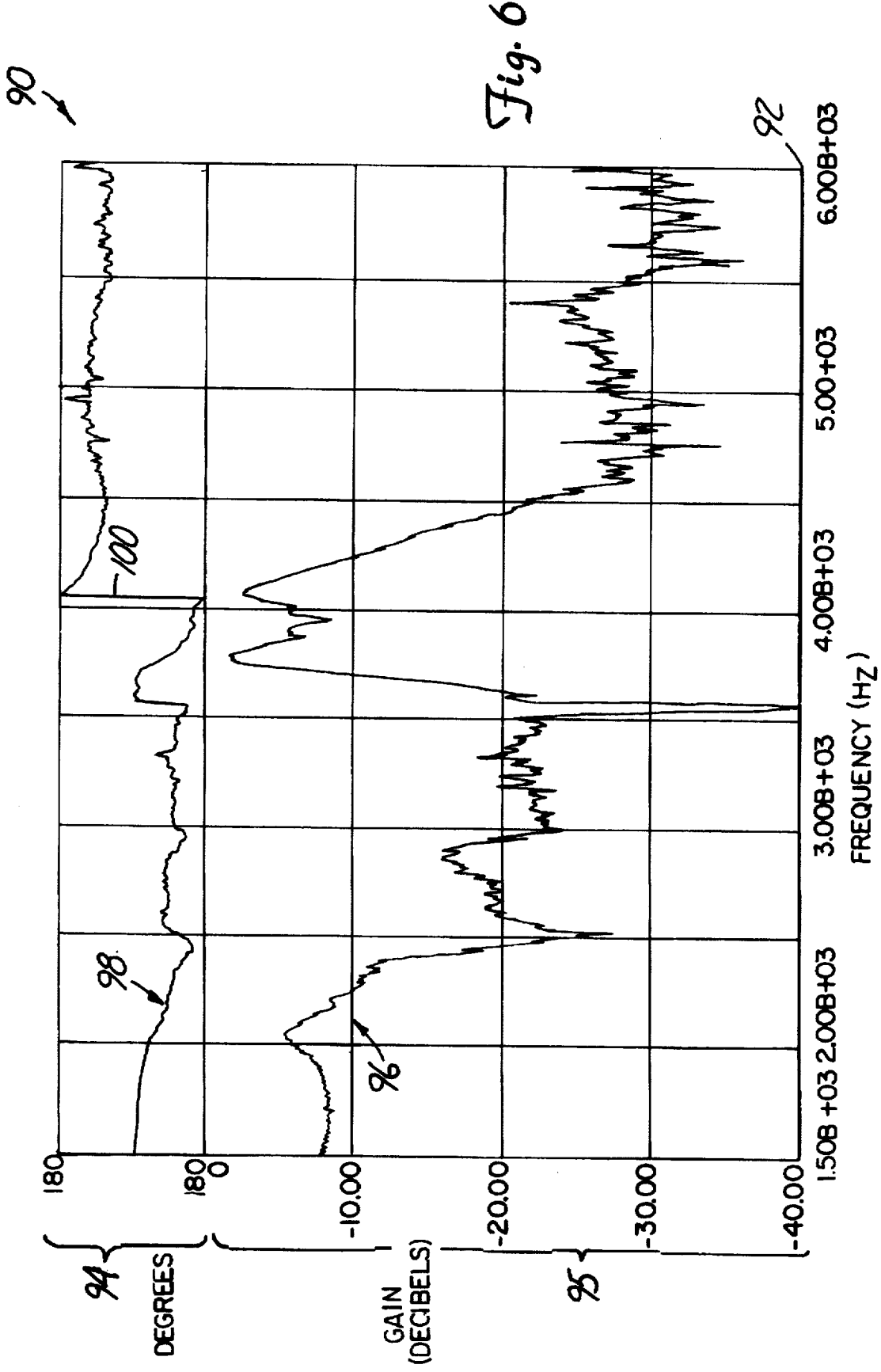

FIG. 6 is the open loop bode plot of a disc drive system employing an actuator with three flange support made in accordance with the present invention as embodied in FIGS. 1–4.

DETAILED DESCRIPTION OF THE PREFERRED EMBODIMENTS

FIG. 1 shows a perspective view of a preferred embodiment of the present invention. Actuator arm assembly 10 comprises E-block 12, central portion 14, flex cable 16, first flange 18, second flange 20, third flange 22, voice coil 24, latch arm 26 and actuator spindle aperture 28. Also illustrated are first voice coil width (or top) 30, first voice coil length (or side) 32, second voice coil width (or bottom) 34 and second voice coil length (or side) 36 (shown in FIG. 1A).

E-block 12 comprises a plurality of track accessing arms 11a–11k each of which supports a transducer head assembly (not shown). Mass reducing holes 13 are also provided on track accessing arms 11a–11k. E-block 12 is connected to a side of central portion 14 distal to voice coil 24. Flex cable 16 is shown attached to first flange 18 which extends from a side of central portion 14 proximally to voice coil 24. First flange contacts first voice coil width 30. Second flange 20 also extends from a side of central portion 14 proximal to voice coil 24 but is spaced longitudinally below first flange 18. Second flange 20 contacts first and second voice coil lengths 32 and 36 (not shown), respectively. Second flange 20 is shown as to have a wider shape than first flange 18 or third flange 22 in order to provide actuator stop surfaces. Third flange 22 extends from a side of central portion 14 proximal to voice coil 24 but is spaced longitudinally below second flange 20. Third flange 22 contacts second voice coil width 34. Flanges 18, 20 and 22 form a coil support structure in accordance with the present invention. Latch arm 26 is provided to secure actuator arm assembly 10 when the disc drive is not operating. Central portion 14 surrounds aperture 28 which receives an actuator spindle (not shown). Central portion 14 and aperture 28 form an axis of rotation between E-block 12 and voice coil 24.

FIG. 1A is presented to clearly show voice coil 24 with first voice coil width (or top) 30, first voice coil length (or side) 32, second voice coil width (or bottom) 34 and second voice coil length (or side) 36. FIG. 1A shows the relation between second flange 20 and lengths 32 and 36 of voice coil 24.

FIG. 2 shows a perspective view of magnetic pole piece 40 which is used in conjunction with actuator arm assembly 10 of FIG. 1 in a preferred embodiment of the present invention. Magnetic pole piece 40 comprises front leg 42, back leg 44, permanent magnets 46, front gap surface 47, gap space 48, back gap surface 49, slot 50 and screw holes 52, 54, 56 and 58. In this embodiment, permanent magnets 46 are positioned on front gap surface 47 of front leg 42. In alternative embodiments, permanent magnets 46 could also be found on back gap surface 49 of back leg 44. Permanent magnets 46 create a permanent magnetic field within gap space 48 of magnetic pole piece 40. When used in conjunction with actuator arm assembly 10 of FIG. 1, voice coil 24 slides into gap space 48 between front leg 42 and back leg 44. Second flange 20 fits into slot 50 and intersects a space between permanent magnets 46.

FIG. 3 shows a side cross sectional view of actuator arm assembly 10 when inserted into magnetic pole piece 40. E-block assembly 12 is shown extending from a side of central portion 14 distal to magnetic pole piece 40. First flange 18, second flange 20 and third flange 22 extend from a side of central portion 14 proximal to magnetic pole piece 40. First flange 18, second flange 20 and third flange 24 are attached to voice coil 24. First flange 18 extends from central portion 14 over front leg 42 and permanent magnets 46 of magnetic pole piece 40 to contact first voice coil width 30. Third flange 22 extends from central portion 14 below front leg 42 and permanent magnets 46 of magnetic pole piece 40 to contact second voice coil width 34. Second flange 20, however, fits into slot 50 in front leg 42 of magnetic pole piece 40 to contact first voice coil length 32 and second voice coil length 36 (not shown). Permanent magnets 46 are split so as to allow second flange 20 to intersect and contact the lengths of voice coil 24.

Voice coil 24 fits into gap space 48 between front leg 42 and back leg 44 of magnetic pole piece 40. As seen in this side view, all three flanges provide support for voice coil 24 in a compact fashion. Further, second flange 20 does not substantially enter gap space 48 so magnetic flux density is not significantly affected.

FIG. 4 shows a perspective view of actuator arm assembly 10 and magnetic pole piece 40 shown in FIG. 3. Here, E-block 12 is shown with transducer head assembly 62 attached. Transducer head assembly 62 reads and writes data from magnetic media disc 60. E-block 12 extends from a side of central portion 14 distal to magnetic pole piece 40. Flex cable 16 is shown attached to first flange 18 which extends from a side of central portion 14 proximal to magnetic pole piece 40. First flange 18 lies over front leg 42 and permanent magnets 46 to contact first voice coil width 30. Second flange 20 also extends from a side of central portion 14 proximal to magnetic pole piece 40 and is spaced longitudinally below first flange 18. Second flange 20 fits in slot 50 of front leg 42 and intersects a gap in permanent magnets 46 to contact first voice coil length 32 and second voice coil length 36 (not shown). Third flange 22 extends from a side of central portion 14 proximal to magnetic pole piece 40 and is spaced longitudinally from second flange 20. Third flange 22 lies below front leg 42 and permanent magnets 46 to contact second voice coil width 34 (not shown).

Voice coil 24 fits within gap space 48 of magnetic pole piece 40. Voice coil 24 is activated by the servo control system (not shown) of the disc drive. Voice coil 24 receives current which then induces a transient magnetic field to emanate from it within gap space 48. This transient field interacts with the permanent magnetic field produced in gap space 48 by permanent magnets 46. The interaction of the two magnetic fields, causes voice coil 24 to move in an arcuate path within gap space 48 of magnetic pole piece 40.

Without the support of second flange 20, movement of voice coil 24 would induce it to vibrate back and forth so as to cause first voice coil length 32 and second voice coil length 36 to bow out, alternately, in a first direction toward front leg 42 and a second direction toward back leg 44 (i.e. bending out-of-plane). At lower frequencies, this out-ofplane bending can cause unintended movement of the E-block. This unintended movement results in off-track error.

However, by adding second flange 20 to the support structure, the natural frequencies of the voice coil are increased. Essentially, the addition of second flange 20 shortens the unsupported length of the voice coil columns. The net result is a stiffer voice coil with higher natural frequencies. As stated earlier, the benefit of higher natural frequencies is reduced off-track error and/or improved gain margin.

Thus the increase in natural frequency of voice coil 24 eliminates the problematic low frequency resonances of the structure. The dramatic improvement in servo control which results from the addition of second flange 20 is shown below.

FIG. 5 shows the open loop bode plot 70 of a disc drive system using actuator arm assembly 10 and magnetic pole piece 40 of FIGS. 1–4, without second flange 20 to support voice coil 24. A bode plot is the response of a servo system to a disturbance or input. X axis 72 shows frequency in Hertz (Hz). Y axis 74 shows phase ranging from –180 to 180 degrees while Y axis 75 is gain in decibels.

Graph 76 shows the gain response of the servo system. Graph 78 shows the phase response of the servo system. Peak 80 on graph 76 represents the problematic out-of-plane bending mode of voice coil 24. Peak 80 occurs at approximately 3000 Hz and shows no gain. In severe cases, lack of gain margin at this resonance causes severe servo instability and transducer off-track error problems. Other resonances (such as those represented by peaks 81 and 82) are also shown on graph 76. However, the present invention focuses on off-track out-of-plane bending modes of voice coil 24 which occur at a relatively low frequency of 3000 Hz.

FIG. 6 shows the open loop bode plot 90 of a disc drive system using actuator arm assembly 10 and magnetic pole piece 40 in accordance with the present invention. In other words, second flange 20 is in place to provide improved support for voice coil 24. X axis 92 shows frequency in Hertz (Hz). Y axis 94 shows degrees ranging from –180 to 180. Y axis 95 is gain in decibels.

As is the case with FIG. 5, graph 96 shows the gain response of the servo system and graph 98 shows the phase response of the servo system. As graph 96 shows, the addition of the second flange 20 eliminates the problematic bending mode of voice coil 24 at approximately 3000 Hz. In other words, peak 80 is eliminated. In fact, the natural frequency of the out-of-plane bending mode occurs at a much higher frequency which is not represented on this bode plot.

Movement of actuator coils when excited by the servo control system, may induce voice coil resonances at various resonant frequencies. When an actuator voice coil experiences out-of-plane bending at relatively low problematic frequency ranges, off track errors occur. In general, bending or resonances which occur at relatively high frequencies minimize off-track errors and maximize gain margin. The natural frequency of out-of-plane bending of the actuator coil can be increased by providing proper actuator support.

In a preferred embodiment of the present invention, an intermediate second flange of a three flange actuator support structure provides added stiffness and increases the natural frequencies of all natural frequencies of the voice coil. The three flange actuator support design was found to be most practical in terms of effectiveness and space considerations, although additional flanges could also be added.

Although the present invention has been described with reference to preferred embodiments, workers skilled in the art will recognize that changes may be made to form and detail without departing from the spirit and scope of the invention.

What is claimed is:

1. A disc drive system for writing data to and retrieving data from tracks of a magnetic media disc mounted for rotation on a spindle, the disc drive system comprising:
   a transducer for recording and retrieving the data from the disc;
   a magnetic pole piece;
   a voice coil magnetically coupled to the magnetic pole piece;
   a track accessing arm with a first end and a second end, the first end coupled to the transducer;
   an elongated opening in the second end of the track accessing arm forming a longitudinal axis of rotation for the track accessing arm, the elongated opening positioned between the first end of the track accessing arm and the voice coil;
   first means mounting the voice coil to the second end of the track accessing arm;
   second means mounting the voice coil to the second end of the track accessing arm, the second means longitudinally spaced apart from the first means; and
   third means mounting the voice coil to the second end of the track accessing arm, the third means longitudinally spaced apart from the first and second means by sections of the second end of the track accessing arm which are not coupled to the voice coil and the third means intermediate from the first and second means, whereby natural resonant frequencies of the voice coil are increased.

2. The disc drive system of claim 1 wherein the third means for mounting is a flange.

3. The disc drive system of claim 2 wherein the flange contacts the voice coil at two separate locations, thereby increasing the natural resonant frequency of the voice coil.

4. The disc drive system of claim 2 wherein the magnetic pole piece has a front leg proximate to the elongated opening and a rear leg distal to the elongated opening.

5. The disc drive system of claim 4 wherein the front leg of the magnetic pole piece is formed from two individual pieces defining a slot therebetween.

6. The disc drive system of claim 5 wherein the slot on the front leg of the magnetic pole piece receives the flange and the voice coil is received between the front leg and the rear leg.

7. A disc drive system comprising:
   a plurality of magnetic discs;
   an E-block assembly, comprising:
      an elongated central portion having an axis of rotation along a longitudinal axis, and having first and second ends spaced apart along the longitudinal axis of the elongated central portion;
      a plurality of track accessing arms carrying a plurality of transducers at distal ends adjacent the plurality of magnetic discs, and having proximal ends coupled to the elongated central portion and spaced apart along the longitudinal axis of the elongated central portion;
   a magnetic pole piece;
   a voice coil magnetically coupled to the magnetic pole piece and having first and second ends;
   a first flange connected between the first end of the elongated central portion and the first end of the voice coil;

a second flange connected between the second end of the elongated central portion and the second end of the voice coil; and means for reducing an unsupported length of the voice coil.

8. The disc drive system of claim 7 wherein the means for reducing an unsupported length of the voice coil is a flange connected between the voice coil and the elongated central portion.

9. The disc drive system of claim 8 wherein the flange contacts the voice coil at two points.

10. The disc drive system of claim 9 wherein the two contact points form oscillation nodes which increase the natural resonant frequency of the voice coil.

11. The disc drive system of claim 8 wherein the magnetic pole piece has a front leg proximate to the elongated central portion and a rear leg distal to the elongated central portion.

12. The disc drive of claim 11 wherein the front leg is formed by two individual pieces defining a slot that receives the flange and the voice coil is received between the front leg and the rear leg of the magnetic pole piece.

13. A disc drive system comprising:

a plurality of magnetic discs;

an E-block assembly, comprising:

an elongated central portion having an axis of rotation along a longitudinal axis, and having first and second ends;

a plurality of track accessing arms carrying a plurality of transducers at distal ends adjacent the plurality of magnetic discs, and having proximal ends coupled to the elongated central portion and spaced apart along the longitudinal axis of the elongated central portion;

a magnetic pole piece;

a voice coil magnetically coupled to the magnetic pole piece and having first and second ends;

a first flange connected between the first end of the elongated central portion and the first end of the voice coil;

a second flange connected between the second end of the elongated central portion and the second end of the voice coil; and a third flange connected between the elongated central portion and the voice coil for reducing an unsupported length of the voice coil.

* * * * *